United States Patent [19]
White

[11] Patent Number: 5,688,392
[45] Date of Patent: Nov. 18, 1997

[54] MACHINING BY ELECTRICAL REMOVAL OF MATERIALS UTILIZING DISPERSIONS OF INSOLUBLE PARTICLES

[75] Inventor: James H. White, Boulder, Colo.

[73] Assignee: Eltron Research, Inc., Boulder, Colo.

[21] Appl. No.: 524,621

[22] Filed: Sep. 7, 1995

[51] Int. Cl.$^6$ .................................. B23H 7/00; B23H 7/34
[52] U.S. Cl. .................... 205/654; 205/671; 205/672; 205/686; 205/674; 205/668; 219/69.17
[58] Field of Search ........................... 205/652, 653, 205/654, 662, 672, 674, 686, 671, 668; 219/69.17

[56] References Cited

U.S. PATENT DOCUMENTS

| | | | |
|---|---|---|---|
| 3,293,163 | 12/1966 | O'Connor | 205/654 X |
| 3,523,834 | 8/1970 | Hewins | 205/662 X |
| 3,801,487 | 4/1974 | Dietrich | |
| 4,131,523 | 12/1978 | Faul et al. | 205/686 X |
| 4,375,588 | 3/1983 | Frei | 219/69.17 |
| 4,522,692 | 6/1985 | Joslin | |
| 4,997,534 | 3/1991 | Thornton | |
| 5,002,643 | 3/1991 | Andrews | |
| 5,114,548 | 5/1992 | Rhoades | |
| 5,149,405 | 9/1992 | Bruns et al. | |
| 5,306,402 | 4/1994 | Frembgen | |
| 5,427,692 | 6/1995 | Thornton | 204/DIG. 13 X |

OTHER PUBLICATIONS

Fleischmann, M. et al. (1985), *J. Phys. Chem.*, 89: 5530.
Fleischmann, M. et al. (1986), *J. Phys. Chem.*, 90: 6392.
Rolison, D. et al. (1989), *J. Phys. Chem.*, 93: 5524.
Rolison, D. et al. (1990), *Chem. Rev.*, 90: 867.
Wang, J. et al. (1992), *Analy. Chem.*, 64: 1285.
Scholz, F. et al. (1994), *Chem. Soc. Rev.*, 23, 341.
Ahlberg, E. et al. (1994), *Hydromettal.*, 36, 19.
Ahlberg, E. et al. (1994), *Hydromettal.*, 34, 171.
Ni, X. et al., (1993), *Electrochem.*, 140, 3505.

*Primary Examiner*—Donald R. Valentine
*Attorney, Agent, or Firm*—Greenlee, Winner and Sullivan, P.C.

[57] ABSTRACT

A method of machining the surface of an electrically conductive workpiece by application of a voltage to an electrically conductive tool spaced apart from the workpiece and moving the tool to shape or pattern the workpiece wherein variable flow of fluid is provided in the space between the tool and the workpiece. The fluid contains suspended insoluble interactive particles that are electrically conductive or are ionically conductive, but electronically insulating. The suspended particles came intermittent electrical short circuiting between the tool and the workpiece to prevent catastrophic and uncontrolled sparking or arcing during machining.

22 Claims, 4 Drawing Sheets

MACHINING BY ELECTRICAL REMOVAL OF MATERIALS UTILIZING DISPERSIONS OF INSOLUBLE PARTICLES

TECHNICAL FIELD

This invention relates to the machining of metals using electrodissolution (electrochemical machining or ECM) or electric discharges accompanying ECM using collections of particles suspended in a liquid with or without an electrolyte between a workpiece (anode) and tool (cathode).

BACKGROUND ART

Processes using the passage of electric current for machining of metals are well established. The techniques are employed in machining of very hard refractory materials or of materials difficult to machine for other reasons. For example, highly energy-absorbing materials, such as titanium, are not easily machined using conventional methods because the materials tend to heat up and damage the tools employed. Electrochemical machining (ECM), electric discharge machining (EDM), and combinations of the two have the general advantages of allowing for the machining of stocks into complex geometrical shapes with simple translational motions. For example, a complex shape may be easily machined by shaping the cathode in a corresponding shape prior to machining, allowing the use of simple motions to perform the machining. Currently, ECM is conducted by bringing a cathode into close proximity to the workpiece (anode) and delivering an electrolyte through channels internal or external to the cathode so that electrical (ionic) contact is established between the two electrodes. A similar approach is used in EDM except that electrolyte is replaced with a dielectric liquid and metal removal occurs by sparking between anode and cathode. Such discharge phenomena occur also in ECM, but typically as an undesirable side process. Passage of current or application of voltage between anode and cathode results in the dissolution of the anode at a rate depending on the instantaneous current. In ECM, it is often desirable to pulse the voltage or current by means of an external circuit or mechanical solenoid causing intermittent short circuiting between anode and cathode. The effect of the pulses is to disrupt uncontrolled short circuiting and, when bipolar, to mitigate passivation effects.

Current approaches of ECM are problematic in several ways: 1) the formation of gas bubbles between anode and cathode leads to poor control of anode shape and to catastrophic and uncontrolled sparking or arcing; 2) many refractory materials are very difficult to machine by means of ECM because of very low dissolution rates; 3) stray dissolution outside of the cut occurs; 4) electrically insulating (passive) films, consisting of metal oxide films formed by reaction of water with metal during machining, are produced, leading to stoppage of the process because of the resultant inability to pass current; 5) Joule heating occurs, leading to misshaped anode pieces, the evolution of bubbles, and eventual arcing or sparking; and 6) surface finishes of many materials are often very poor.

All currently known electrochemical machining approaches use a solid or porous cathode with electrolyte between anode and cathode. The employment of particle dispersions between anode and cathode can aid in alleviating the problems associated with ECM as currently utilized. The present invention is very unique in approach and implementation, as the following presentation of the prior art will show.

In U.S. Pat. No. 5,114,548, to Rhoades, nonconductive abrasive particles were embedded in or attached to a conductive cathode. Bringing the nonconductive particles into contact with the anode in an orbital oscillating fashion during electrochemical machining resulted in the simultaneous abrasion of the anode (workpiece) surface and electrodissolution of the workpiece. This has the beneficial effect of removing passivating films during the course of ECM and of protecting the unground portion of the workpiece from electrodissolution. However, this method does not utilize particles dispersed in the electrolyte, but actually uses particles imbedded in the cathode itself. Further, this approach does not allow for variation of anode-cathode spacing, mitigation of sparking or arcing, minimization of Joule heating, continuous shaping of cathode, long cathode lifetime, or continuous variation in electrolyte properties.

U.S. Pat. No. 4,522,692, to Joslin, described a porous cathode for uniform electrochemical machining of a workpiece. The electrolyte was forced through a porous metal filter brought into close proximity to the workpiece. Electrochemical machining could be conducted uniformly across a large area workpiece in this manner. However, this method did not address the problems of Joule heating, sparking, anode passivation, variation in electrolyte transport properties, or shaping of the cathode.

Other known patents relate to various aspects of conventional electrochemical machining including machining current, gap spacing, cathode construction, spark detection, and protection against stray dissolution.

U.S. Pat. No. 5,306,402, to Frembgen, disclosed a method for control of the machining current between anode and cathode by allowing the anode-cathode gap to increase during machining while increasing the current density, so as to maintain a constant or increasing ratio of current to machined area. This method addresses only the control of current density and no other problems.

U.S. Pat. No. 4,997,534, to Thornton, described a method for protection of workpieces outside the area defined by the projection of the cathode onto the anode. The method consisted of adding a noble metal salt (based on Ru, Rh, Pd, Ir, or Pt) to an alkali metal salt bath and having the noble metal plate onto the outside areas during machining. The method is very expensive to implement and does not address other cited problems.

No literature has been found on the subject of using particulate dispersions for electrochemical machining, electrical discharge machining, or a combination of these methods. However, a number of articles have appeared relating to the use of dispersions of insoluble materials in electrochemistry. For example, two articles (M. Fleischmann, J. Ghorogholian, and S. Pons, J. Phys. Chem., 89, 5530 (1985); M. Fleischmann, J. Ghorogholian, and S. Pons, J. Phys. Chem., 90, 6392 (1986)) presented theoretical descriptions of electrified particle dispersions. The particles were assumed to function as bipolar ultramicroelectrodes in which anodic and cathodic reactions occurred at each particle. Other articles (D. R. Rolison, E. A. Hays, and W. E. Rudzinski, J. Phys. Chem., 93, 5524 (1989); D. R. Rolison, Chem. Rev., 90, 867 (1990)) presented experimental results for then use of zeolite dispersions in carrying out electrochemical reactions of organic molecules. None of these articles described the use of particle dispersions in influencing metal removal.

Several approaches utilize carbon paste electrodes and, particularly, their employment in the analysis of insoluble solids. One article (J. Wang, N. Naser, L. Agnes, H. Wu, and L. Chen, Analytical Chemistry, 64, 1285 (1992)) describes the use of carbon paste electrodes incorporating dispersed metals for analysis and electrocatalysis. However, employment in ECM or EDM or combined ECM/EDM is not reported or applicable. Other articles, (F. Scholz and B. Meyer, Chemical Society Reviews, 23, 341 (1994); E. Ahlberg and J. Asbjornsson, Hydrometallurgy, 36, 19 (1994); E. Ahlberg and J. Asbjornsson, Hydrometallurgy, 34, 171 (1994)) concerned the use of carbon paste electrodes in the analysis of insoluble and even poorly conducting solid. The solid compounds, including sphalerite and calena, were analyzed by incorporation into carbon paste electrodes and performing potentiodynamic measurements upon them. Again, the use of these electrodes in electrochemical metal removal was not the issue addressed.

Some approaches utilize other methods of achieving simultaneous machining and discharge. For example, one article (X. Ni, J. A. McGeough, and C. A. Greated, J. Electrochem. Soc. 140, 3505 (1993)) reported experimental observations of controlled electrical discharges in aqueous electrolytes. The process evidently involved both electrochemical machining and electrical discharge processes. The process required intermittent contact between anode and cathode by means of a solenoid placed between them. The presence of small gas bubbles (which are difficult to controllably generate) interposed between the two electrodes was evidently a requirement for achieving the discharge phenomena, which led to greater removal rates and smoother finishes.

DISCLOSURE OF THE INVENTION

The present invention is a process preferably utilizing a device that includes a workpiece (anode), tool (cathode), a liquid or an electrolyte containing electrically conducting particles of sizes from 10–10,000 Å, a power supply, a pump for moving electrolyte between a reservoir and anode, a mounting stage, and a mechanical device for removal of anode and cathode with respect to one another. The anode is the part from which metal is removed. The cathode is the tool that, when brought into close proximity to the anode, results in the shaping of the workpiece according to the shape of the tool (cathode) when electric current is passed by the external power supply, resulting in a flow of ions between anode and cathode, along with electrodissolution of the anode or removal of metal from the anode by sparking or arcing processes.

The role of the particles suspended in the electrolyte is manifold: 1) At the critical concentration (i.e. a sufficient concentration to allow a transition between the particles in an electrically noninteracting state to a state in which the particles interact with each other to the point of very briefly short circuiting anode and cathode), stochastic or random shorting between anode and cathode can result in minimization of catastrophic sparking between two electrodes. Short circuiting in this context refers to the direct conduction of electrons between anode and cathode via the particles, as opposed to the normal purely ionic conduction between anode and cathode; 2) particles can chemically interact with the anode surface, resulting in a higher interfacial than bulk concentration of the particles, modification of the chemical and physical properties of the material, such as in reacting with surface oxygen to improve surface finish and prevent passive film formation, and blocking of the surface external to the cut (region of machining); 3) the inclusion of particles in the electrolyte can improve electrolyte transport properties such as by increasing thermal conductivity, and by increasing overall ionic and electrical conductivity resulting in improved cut shape and dimensional control; 4) the presence of particles in sufficient concentrations can disrupt the normal ionic migration and diffusion paths, resulting in substantial variation of the extent and in depth of cuts; 5) at the critical concentration, the occurrence of enhanced order of particles and electrolyte can result in enhanced features of material removal such as smoother surface finish; 6) particles can enhance the rates of removal of dissolved or precipitated products of dissolution by adsorbing dissolution products and transporting them away from the anode; 7) by effectively increasing the cathode surface area (i.e. the actual area available for the occurrence of electrochemical reaction), the rates of evolution of gases can be decreased because of lowered current density, improving final dimensional control; 8) the presence of particles can lower the resistance between anode and cathode, reducing the amount of Joule heating (heating due to electrical resistance of the medium, including electrolyte and anode through which current is passed) at the anode and consequently improving dimensional control; 9) particles can actually be used to replace the electrolyte, allowing for the possibility of eliminating of the use of toxic materials and the regeneration of electrolytes by simple washing and ion exchange operations; 10) the concentration of particles should be strongly dependent on flow velocity, since the critical concentration will be influenced by this parameter; and 11) the intermittent formation of chains of particles coming into close proximity with the anode can result in microscopic sparking which tends to suppress catastrophic macroscopic sparking which can damage the workpiece and aid in the breakdown of passive films, which can interfere with the process by causing a high electrical resistance which can impede the process by greatly increasing the power requirements. Under any circumstance, the reactions occurring at the anode will be of the forms:

$$M(s) \rightleftharpoons M^{n+} + n e^-$$

in which the anode material is oxidized and dissolves and

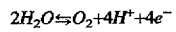

$$2H_2O \rightleftharpoons O_2 + 4H^+ + 4e^-$$

where water is electrochemically decomposed into oxygen and that at the cathode the gas evolution reactions:

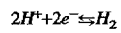

$$2H^+ + 2e^- \rightleftharpoons H_2$$

in an acid medium or

$$2H_2O + 2e^- \rightleftharpoons H_2 + 2OH^-$$

in neutral or basic media. In the presence of particles these processes still occur although they may be modified by their presence, as indicated in 7) above, in which rates are decreased.

The type of particle (electrically conducting or insulating) employed determines the type of electrochemical machining process obtained. A practical lower limit of conductivity for an electrically "conductive" particle would be of the order of $10^{-4}$–$10^{-5}$ $\Omega^{-1} cm^{-1}$. An electrically "insulating" particle will be regarded, practically, as one having a conductivity lower than that for the conducting case. In one, electrolytes normally used are employed in conjunction with electronically conductive particles. In the other, ionically conductive but electronically insulating particles are suspended in an electrolyte-free solvent. Different types of behavior are to be expected from each case. For example, the use of conductive particles is implied when it is desired to reduce sparking, passivation, and Joule heating. Electronically insulating particles may be used to eliminate noxious electrolytes or electrolyte oxidation products or to effect a form of electrical discharge machining, in which an arc between electrodes is used to remove metal from one of the electrodes. Both dissolution and arcing processes may occur simultaneously. Combination of the two approaches yield an electrochemical machining method producing cuts without noxious products.

Particles impose additional requirements on the construction of electrolyte delivery systems. Pumps must survive abrasiveness and flow paths must not readily clog. The use of abrasive or slurry pumps or a compressed air (fountain) drive are suggested for these reasons.

Electrochemical machining in the presence of particles differs from conventional electrochemical machining in that a sufficiently high concentration of particles may result in a gel or solid electrolyte. In this case, liquid (water) may have to be delivered external to the cathode rather than through electrolyte channels contained in the tool. Additionally, material removal rates and cut extent and distribution should depend far more strongly on electrolyte flow rate and current density than without the particles, since the particles are separable from the electrolyte. Impact of the suspension with the workpiece surface results in mixing or separation dependent on flow velocity and electrophoretic effects (due to current flow).

This invention will be discussed in greater detail in the description which follows. Additional advantages of the invention will become apparent from this discussion, together with accompanying drawings.

BEST MODE FOR CARRYING OUT THE INVENTION

Figure 1:
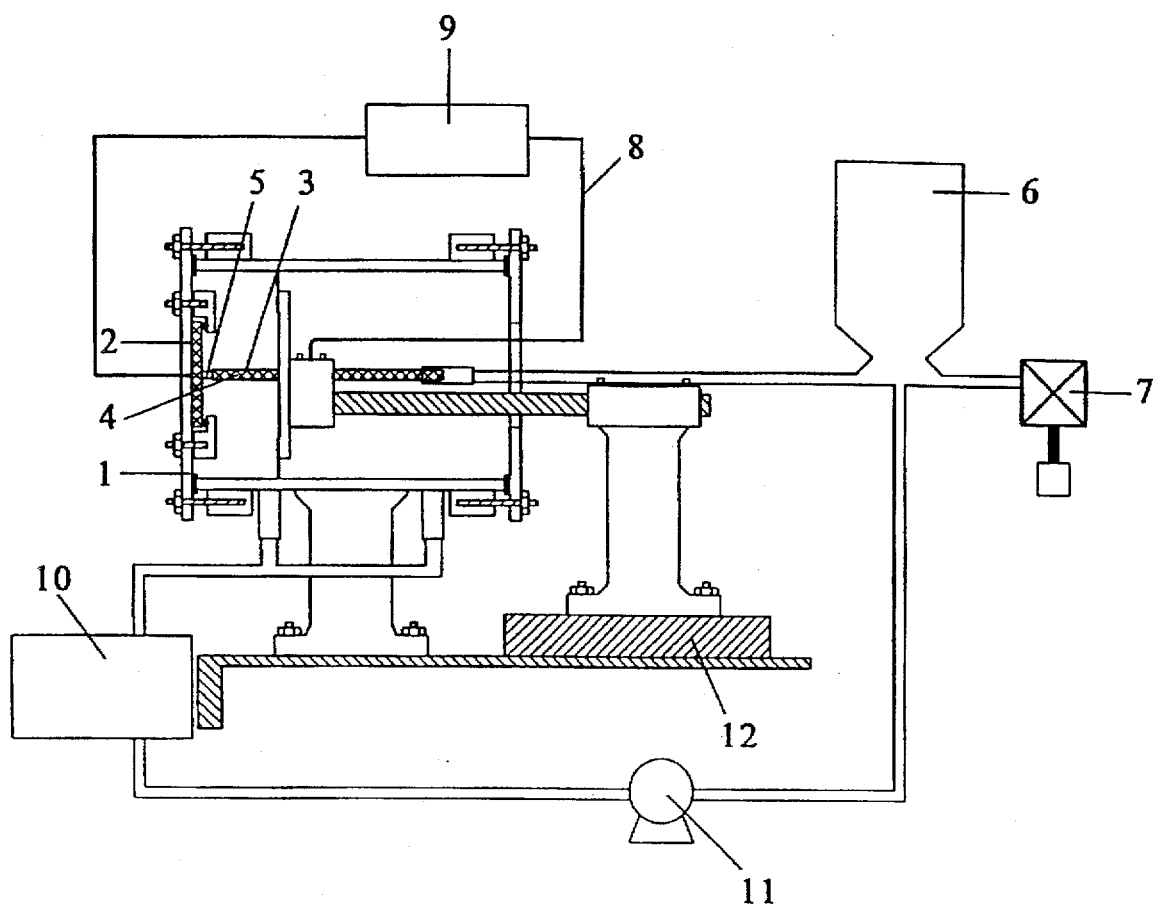
FIG. 1 schematically depicts a configuration of the present invention used for electrochemically removing materials from surfaces.

The invention is implemented in an apparatus as shown in FIG. 1 consisting of an electrolytic cell 1 containing an anode 2 and cathode 3 with channels 4 for delivering electrolyte particle slurry 5 to the anode. The slurry is stored in a vessel 6 which by action of a pump or compressor 7 causes slurry to be delivered through or around the cathode to the anode. An electrical circuit 8 connecting anode and cathode through a power supply 9 which causes a current to pass from anode to cathode by the conduction of ions and electrons between anode and cathode and by the conduction of electrons through the external circuit. The flowing slurry is deflected from the anode and is collected in a bin 10 and returned to the storage vessel by means of another pump 11. A means is provided by a screw or translating table 12 to move the cathode towards and away from the anode.

Figure 2:
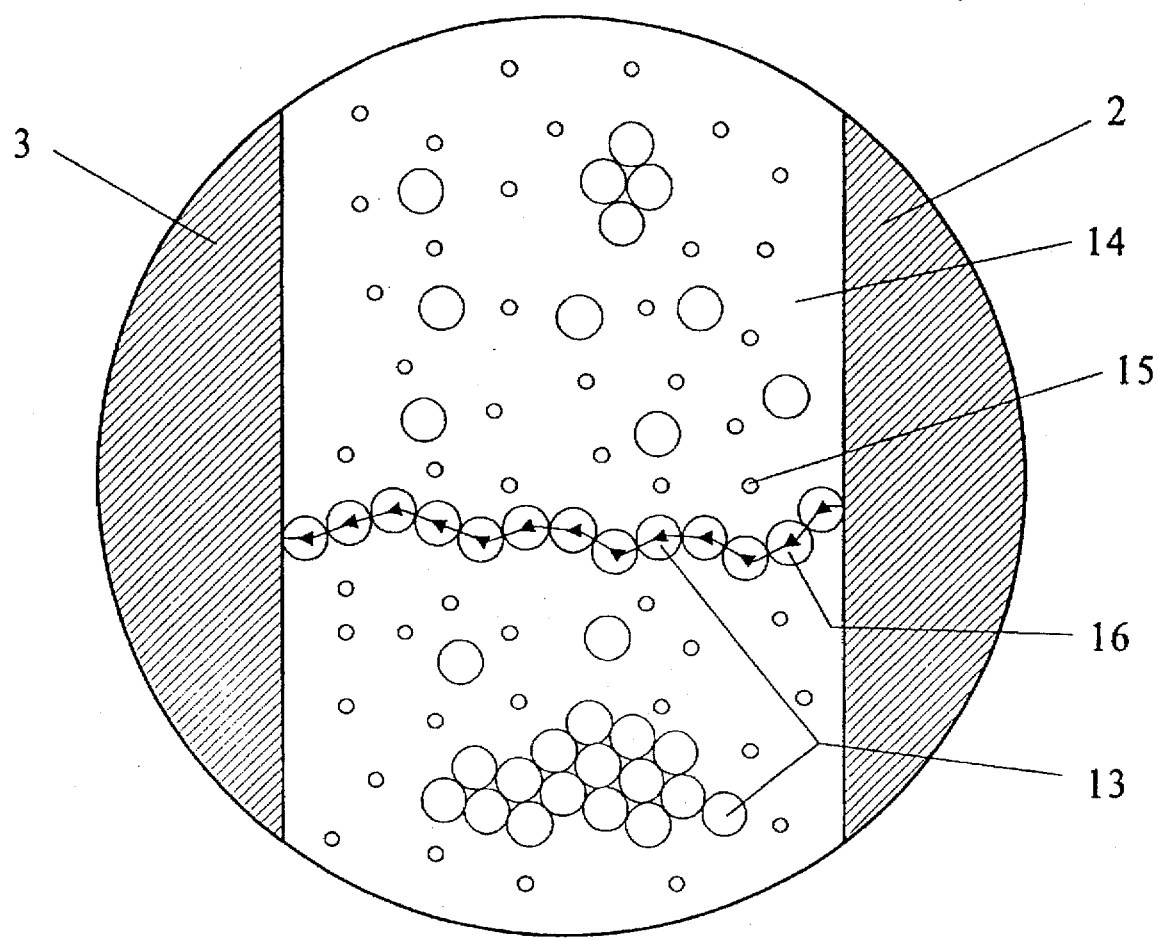
FIG. 2 schematically depicts a proposed microscopic view of the action involved in the invention.

As shown in FIG. 2, the invention involves use of interacting particles 13 suspended in an electrolyte 14. Current is passed between the particles as ions 15 electrons 16, or both. The concentration of particles is such as to permit this passage under conditions in which the electrolyte is not in motion or when it is impacted upon the anode after emerging from the cathode.

Specific examples of electrically conductive particles that can be employed include solid carbon in any form, and metal particles. Examples of ionically conductive, electronically insulating particles include polymer beads, particulate insoluble minerals, metal oxides and other insoluble inorganic solids, natural or synthetic zeolites or analogs, and finally, colloidal materials. The range of materials is limited only by the requirements of electronic conductivity. In addition to insolubility in the electrolyte or medium (solvent) employed, the particle may interact with the anode chemically in some manner that may make their employment desirable or undesirable. Which particles are actually employed, may, in the end, depend on this composition. For example, with materials readily forming carbides that are relatively easily machined, the use of carbon particles is indicated. For materials sensitive to reaction of the particles with oxygen consuming materials, preoxidation of the particles by exposure to oxidant or air at elevated temperatures, or the use of an oxide material may be necessary.

The particles may be consumed in the case of the electrochemical process, although it will usually be in the case that they are not actively involved in electrochemical processes in terms of being consumed in the overall stoichiometry.

Process variables of importance when performing electrochemical machining using particles include particular concentration, velocity, electrolyte channel and orifice size, flow path lengths (anode-cathode gap spacing), and slurry temperature. These operating parameters determine the actual conductivity of the slurry, and the types of paths available for conduction of current. Selectively changing these variables allows the degree of short circuiting to be controlled, so that the optimum level of short circuiting for the desired machining process may be achieved. In particular, the voltage, conductivity, and current fluctuations resulting from the short circuiting may be optimized by changing these variables. For example, under conditions of sufficiently high particle concentration that enough particles contact each other, the cathode may be regarded as coming into very close contact with the surface (on the scale of particle diameters) or as a line of conductive objects reaching from cathode to anode. The velocity of the particle/electrolyte dispersion determines the degree to which the solid particles and the liquid (electrolyte) separate from one another, and consequently, the actual concentration of the particles at the anode (workpiece) surface. The channel and orifice in the cathode through which electrolyte/particle dispersions flow to the work area determine not only the velocity distribution across the channel and orifice, and, as a result, the uniformity of cut depth at the orifice, but more importantly, the distribution of particles in the electrolyte stream, which can strongly influence the uniformity of the cut. The distance that the stream of particles and liquid (including electrolyte) must travel determines the resistance between the anode and cathode and, so, also determines the uniformity of the cut and the control over the dimensions of the cut. The latter occurs because nonuniform resistance between anode and cathode results in nonuniform heating of the electrolyte and nonuniform machining rates. Also, the distance between anode and cathode determines the number of chains of particles fully bridging the gap between the anode and cathode and, therefore, the extent of reduction of electrolyte resistance between them. The temperature of operation influences the rate of material removal, with the higher rates expected for higher temperatures.

The method of employment of the invention determines the type of electrochemical machining process that takes place. Among the processes requiring a focused current are electrochemical drilling, boring, milling, shaping, and cutting. Electrochemical grinding requires unfocused cutting. Whether the dissolution current is focused, or unfocused depends in a complicated manner on the concentration of particles, between cathode and anode which in turn depends on the operating conditions of bulk particle concentration, particle stream velocity, cathode orifice size, particle stream flow path length, current density, anode-cathode spacing, anode material, and temperature as discussed in the preceding paragraph. It is expected that an increasing particle concentration will, up to the critical point (where the slurry becomes electronically conductive), tend to diffuse cuts, while above it, cause a refocusing to occur because of the onset of greater order and increase in the viscosity of the electrolyte. Consequently, grinding operations would tend to be favored by bulk concentrations approaching the critical point, while the operations requiring spatially localized dissolution prefer levels leading to effective particle concentrations beyond the critical point. Adjust of the anode to cathode spacing can, at the critical point, allow for continuous variation in the type of machining done. Thus, continuous motion of the cathode in some programmed fashion can lead to the generation of complicated surfaces without the need for complicated tool shapes or tool substitution during the cut. Cathode materials can include a variety of metals or conductive materials. Copper, aluminum, tungsten, and tungsten-copper alloys would be most commonly used in the cathode construction.

Particle concentrations required to effect machining would typically be found in the critical range. However, this range depends on the size, density, and porosity of the particle and therefore is not identical for all particles. For example, in the case of carbon particles in the form of XC72R, in quiescent (nonflowing) electrolyte, this critical concentration occurs at 55% by volume, while under flowing conditions may occur at as low as 10% by volume. The upper limit of employment is approximately 70%, limited by the gelatinous or almost solid nature of the mixture. In the case of $Fe_3O_4$, the critical concentration is about 10% under quiescent conditions, but, under flowing conditions, may be as low as 3%. An upper concentration limit of 15% is achievable with $Fe_3O_4$.

Electrolytes and solvents would include any which would not rapidly attack or dissolve the particles. Specifically, solvents would include water, organic liquids, and molten salts. Possible electrolytes would include any salt useful for carrying out ECM, such as alkali metal halides, nitrates, or oxyhalides.

The concentration of insoluble particles is controllable by direct addition and dispersion of particles to electrolyte or by fixing their overall concentration and varying their distribution between anode and cathode by application of an electric, magnetic, gravitational, or flow field to the system of particles suspended in electrolyte. Use of electric fields is incidental to the ECM process because of the generation of an electric potential difference between anode and cathode. However, it may be desirable to localize the electric field to redistribute particles. This redistribution will only occur if the particles carry a net surface charge.

The use of magnetic fields in redistributing particles requires that particles be ferromagnetic or contain a ferromagnetic component. Application of the magnetic field then serves to concentrate the particles. This allows the incident stream of particles to be focused or defocused by variation of field strength.

SPECIFIC EXAMPLE OF THE INVENTION

The invention has been applied to electrochemical hole drilling and grinding operations upon refractory materials. The materials Inconel 718, titanium, tungsten carbide, tungsten, molybdenum, niobium, and tantalum have been machined using carbon particles and sodium bromide, sodium chloride, sodium fluoride, sodium hydroxide, and sodium nitrate electrolytes. Specific examples will be discussed in the following paragraphs.

Figure 3:
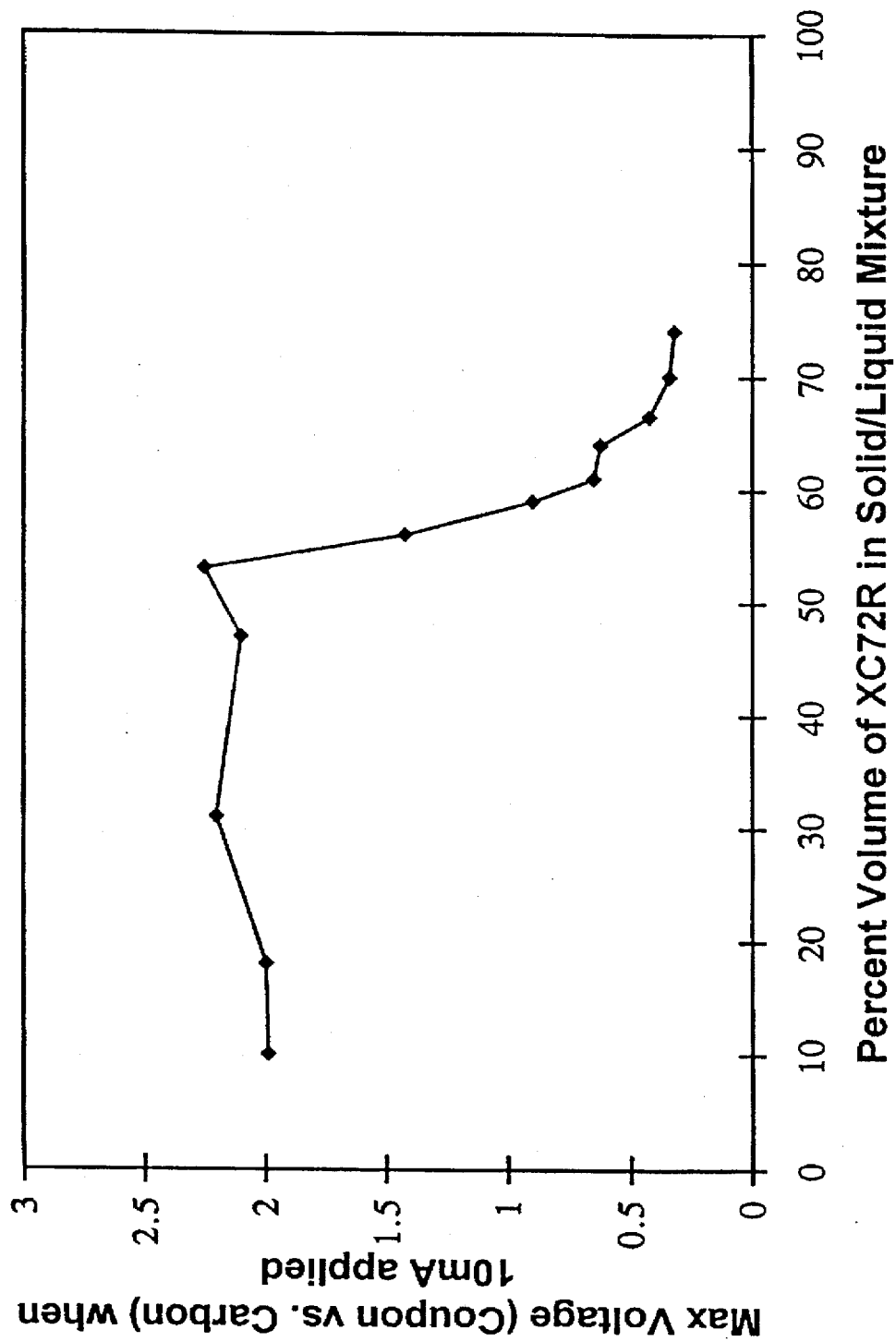
FIG. 3 shows a graph of the voltage difference between an alloy anode and graphite cathode with 10 mA current applied between them as a function of carbon particle volume concentration.
Figure 4:
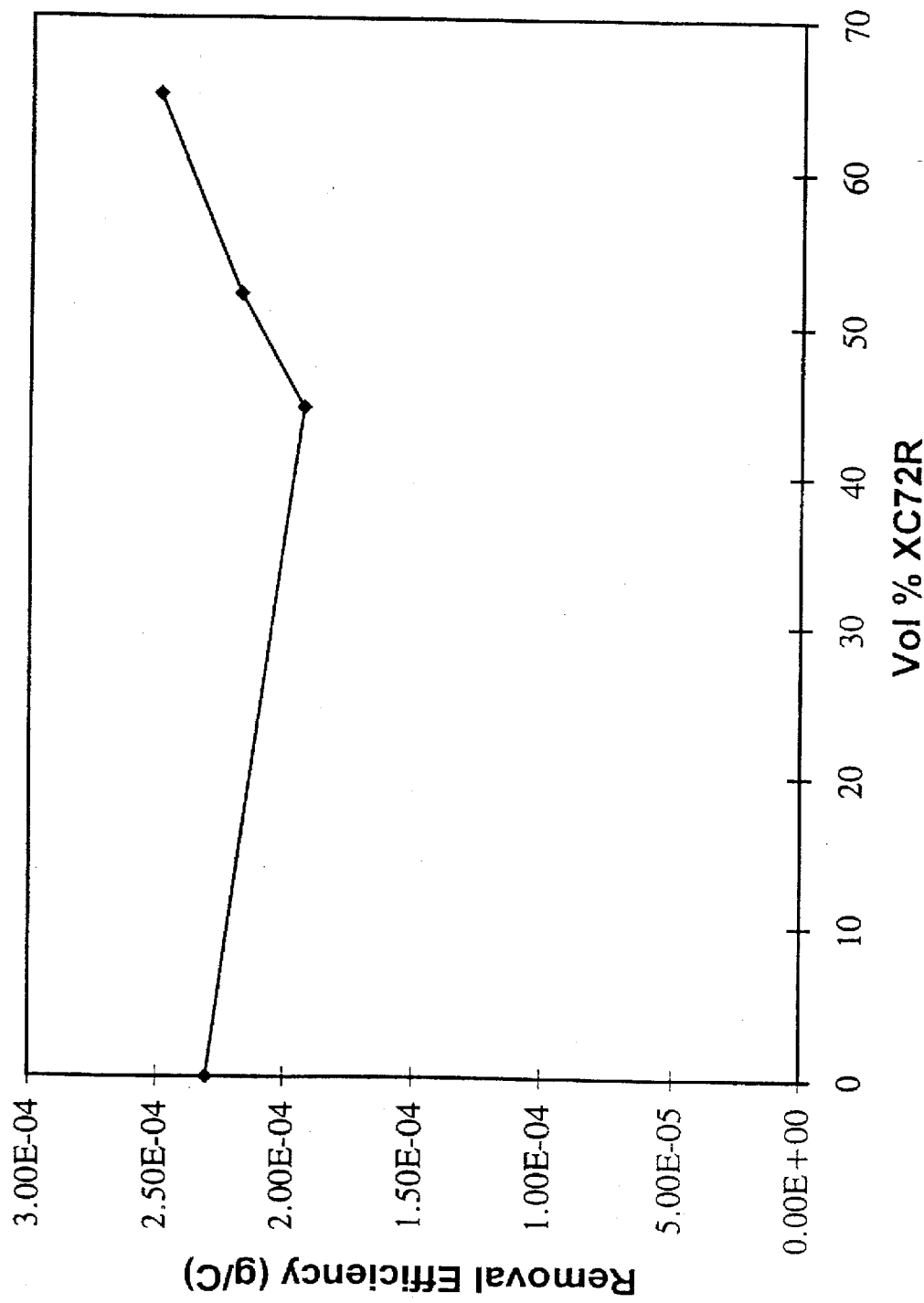
FIG. 4 shows a graph of the amount of material removed per unit of charge passed from the alloy coupon at a current of 1A as a function of carbon particle concentration.

In the first example, Inconel 718 was subjected under quiescent conditions to a current of 0.01 A, applied through the tip of a pointed graphite rod in a medium consisting of 1M NaBr and various volume concentrations of carbon Vulcan XC72R graphitized carbon black). The effect of carbon particle volume concentration is shown in FIG. 3, which shows the voltage sharply variable about a concentration of approximately 55%. This concentration is referred to here as the critical point. Between 0 and 75 vol % carbon, there is an overall voltage and power reduction by a factor of 6–7, illustrating one of the principal advantages of the invention. In FIG. 4 is shown the weight of material removed per unit of charge passed for the passage of a fixed amount of charge (120 C) (Coulombs) at a nominal current of 1 A. It should be noted that at and above the critical point, a constant current could not be maintained because of the rapid and intermittent shorting between anode and cathode. The value of the invention can be seen from consideration of FIGS. 3 and 4: under conditions of as much or more material removal, electric power consumption is greatly reduced. Additionally, morphological evolution of the cut was evident as the XC72R concentration was charged: the area attacked in the electrodissolution process varied from 7 mm in the absence of carbon particles, to 12 mm at 45% carbon and back to 10 mm at 65% carbon.

The above described example was conducted under quiescent (static) conditions of electrolyte particle flow. Under these conditions, the critical point occurred such that the electrolyte was a gel rather than a liquid. This problem was eliminated by channeling the flow of the medium through the cathode and onto the anode. In the second specific example of interest, electrolyte/particle mixtures were caused to flow through a cathode containing a channel and onto the anode (Inconel 718) while a current of 1 A was passed (or attempted to pass). Material removal/C was found to be $2.342 \times 10^{-4}$ g/C for 1 M NaBr, $3.168 \times 10^4$ g/C for 1 M NaBr+15% XC72R, $2.743 \times 10^{-4}$ g/C for 1 M NaBr+25% XC72R, and $1.75 \times 10^{-4}$ g/C for 1 M NaBr+45% XC72R. The cut for carbon concentrations above 25% was diffuse, while for 25% and below was focused.

This invention has been described in detail with reference to a particular embodiment thereof, but it will be understood that various other modifications can be effected within the spirit and scope of this invention.

I claim:

1. A method of machining a surface of an electrically conductive workpiece comprising the steps of:

a. providing a tool having an electrically conductive body;

b. positioning said tool opposite said workpiece with a spacing gap therebetween;

c. connecting said tool and said workpiece to a DC power source such that said tool is cathodic and said workpiece is anodic;

d. providing a channel through which a liquid flow;

e. causing said liquid to flow through said channel and between said tool and said workpiece;

f. suspending insoluble electrically conductive solid particles in said liquid to form a slurry wherein the concentration of particles in said slurry, the size of said particles, the composition of said particles, the velocity of said slurry, the size of said channel, the spacing between said tool and said workpiece and the temperature of said slurry is such to cause intermittent electrical short circuiting between said tool and said workpiece; and g. machining said workpiece by moving said tool in a selected fashion relative to said workpiece.

2. A method of machining as claimed in claim 1, wherein said liquid is an electrolyte.

3. A method of machining a surface of an electrically conductive workpiece comprising the steps of:

a. providing a tool having an electrically conductive body;

b. connecting said tool and said workpiece to a power source such that the tool and workpiece are electrodes of opposite charge;

c. positioning said workpiece and said tool with a spacing gap, therebetween;

d. providing a variable flow of liquid comprising suspended soluble interactive particles which are electrically conductive solid particles to said gap between said tool and said workpiece; and e. machining said workpiece by applying said voltage and moving said tool in a selected fashion relative to said workpiece such that said workpiece is shaped or patterned;

wherein a critical concentration of particles is generated within the spacing gap between said tool and said workpiece such that direct conduction of electrons can occur between said tool and said workpiece thereby causing intermittent electrical short circuiting between said tool and said workpiece when a voltage is applied from said power source to said tool and workpiece.

4. The method of claim 3 wherein said tool is the cathode and said workpiece is the anode.

5. The method of claim 4 wherein said liquid is an electrolyte.

6. The method of claim 5 wherein electrical conduction occurs between said tool and said workpiece with simultaneous dissolution of said workpiece.

7. The method of claim 5 wherein said electrolyte in said spacing gap flows from said tool toward said workpiece.

8. The method of claim 7 wherein the velocity of flow of said electrolyte and/or the spacing gap is selected such that electrical conduction occurs between said tool and said workpiece with simultaneous dissolution of said workpiece.

9. The method of claim 5 wherein the voltage applied is adjusted such that electrodissolution occurs only within the projection of the area of said tool onto said workpiece.

10. The method of claim 5 wherein the particles carry a net surface charge and which further comprising a step of applying an electric field to the spacing gap between said tool and said workpiece to vary the distribution of particles within said spacing gap and thereby vary the shape machined in said workpiece by said tool.

11. The method of claim 5 wherein the particles are ferromagnetic or carry a ferromagnetic component and which further comprising a step of applying a magnetic field to the spacing gap between said tool and said workpiece to vary the distribution of particles within said spacing gap and thereby vary the shape machined in said workpiece by said tool.

12. The method of claim 5 wherein the workpiece is a refractory material.

13. The method of claim 5 performed under quiescent flow conditions.

14. The method of claim 5 wherein said electrically conductive particles are selected from the group consisting of solid carbon, and metal particles.

15. The method of claim 5 wherein said electrically conductive particles are solid carbon particles.

16. The method of claim 5 wherein said electrically conductive particles are graphitized carbon black and said electrolyte is 1 M aqueous NaBr.

17. The method of claim 16 under quiescent flow conditions where the concentration of graphitized carbon black in 1M aqueous NaBr is between 45% and 65%.

18. The method of claim 17 wherein the concentration of graphitized carbon black is approximately 55%.

19. The method of claim 5 wherein adjustment of the spacing gap allows for variation of the type of machining from focused to unfocused cutting.

20. A method of machining a surface of an electrically conductive workpiece comprising the steps of:

a. providing a tool having an electrically conductive body;

b. connecting said tool and said workpiece to a power source such that the tool and workpiece are electrodes of opposite charge;

c. positioning said workpiece and said tool with a spacing gap therebetween;

d. providing a variable flow of an electrolyte-free solvent comprising suspended insoluble interactive particles which are ionically conductive, but electronically insulating, to said gap between said tool and said workpiece; and e. machining said workpiece by applying said voltage and moving said tool in a selected fashion relative to said workpiece such that said workpiece is shaped or patterned;

wherein the size of the ionically conductive particles ranges from 10 Å to 10,000 Å and wherein a critical concentration of particles is generated within the spacing gap between said tool and said workpiece such that direct conduction of electrons or ions, or both can occur between said tool and said workpiece thereby causing intermittent electrical short circuiting between said tool and said workpiece when a voltage is applied from said power source to said tool and workpiece.

21. The method of claim 20 wherein the size of the ionically conductive particles ranges from 10 Å to 2,000 Å.

22. The method of claim 21 wherein said ionically conductive particles are selected from the group consisting of polymer beads, particulate insoluble minerals, natural or synthetic zeolites or their analogues, and colloidal materials.

* * * * *

UNITED STATES PATENT AND TRADEMARK OFFICE
CERTIFICATE OF CORRECTION

PATENT NO. : 5,688,392

DATED : Nov. 18, 1997

INVENTOR(S) : White

It is certified that errors appear in the above-identified patent and that said Letters Patent is hereby corrected as shown below:

At column 3, line 37, please rewrite "removal" as --movement--.

At column 7, line 24, please rewrite "Adjust" as -- Adjustment--.

At column 8, line 24, the phrase "6-7" in bold type should be in normal type as --6-7--.

At column 8, line 49, please rewrite "$3.168 \times 10^4$" as --$3.168 \times 10^{-4}$--.

Signed and Sealed this

Tenth Day of February, 1998

Attest:

BRUCE LEHMAN

*Attesting Officer*  *Commissioner of Patents and Trademarks*